G. H. WHITTINGHAM.
REGULATOR FOR ELECTRIC MOTORS.
APPLICATION FILED FEB. 1, 1917. RENEWED MAR. 26, 1920.
1,340,679.
Patented May 18, 1920.
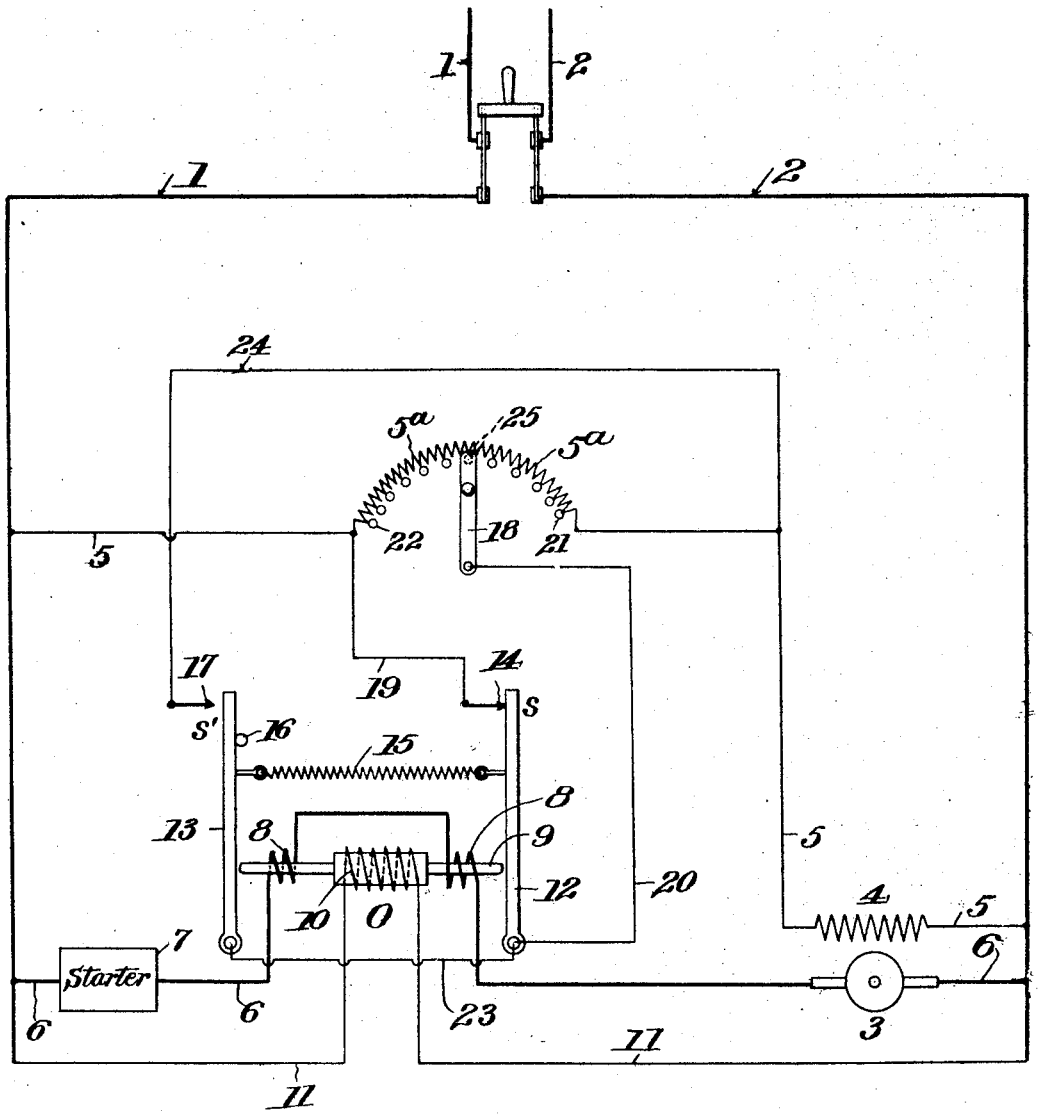

UNITED STATES PATENT OFFICE.

GEORGE H. WHITTINGHAM, OF BANCROFT PARK, MARYLAND, ASSIGNOR TO MONITOR CONTROLLER COMPANY OF BALTIMORE, OF BALTIMORE, MARYLAND, A CORPORATION OF MARYLAND.

REGULATOR FOR ELECTRIC MOTORS.

1,340,679.  Specification of Letters Patent.  Patented May 18, 1920.

Application filed February 1, 1917, Serial No. 146,006. Renewed March 26, 1920. Serial No. 369,028.

*To all whom it may concern:*

Be it known that I, GEORGE H. WHITTINGHAM, a citizen of the United States, residing at Bancroft Park, in the county of Baltimore and State of Maryland, have invented certain new and useful Improvements in Regulators for Electric Motors, of which the following is a specification.

This invention relates to controlling means for electric motors having shunt field windings, with a variable resistance in the field circuit for weakening and strengthening the field to vary the speed of the motor.

The invention comprises a regulating member for adjusting the amount of resistance in the shunt field circuit, a normally closed relay switch connecting said member in the field circuit, a normally open relay switch arranged in a circuit shunting the resistance, and means, common to said switches, and controlled by the armature current, for vibrating the normally closed switch when the regulating member is moved to decrease the resistance in the field circuit, and for vibrating the normally open switch when said member is moved to increase the resistance in the field circuit. It is desirable to be able to set the hand regulating member for any desired running speed without causing an excessive amount of current to flow in the armature circuit, and this is accomplished by means of the vibrating switches which operate, upon change in the position of the regulating member, to rapidly throw in and out the field resistance until the motor adjusts itself to the running speed pre-determined by the adjustment of the regulating member.

In the accompanying drawing, which illustrates my invention, diagrammatically, the two sides of the supply circuit are indicated at 1 and 2, the motor armature is indicated at 3, and the shunt field of the motor is indicated at 4. The shunt field circuit is indicated at 5, extending from the supply wire 1, through field resistance 5ª to the field winding 4, and thence to the supply wire 2. The armature circuit 6, of the motor, extends from the supply circuit 1, through a suitable automatic starter 7, thence through coils 8, which surround a polarized armature 9 of a switch operating mechanism 0, thence to the armature 3 and the supply wire 2. The device 0 comprises the iron armature 9, surrounded by a polarizing coil 10, the windings of which are connected by conductors 11 to the supply wires 1 and 2. The iron armature 9 extends outwardly beyond the ends of the coil 10, and its ends are surrounded by the coils 8 in the armature circuit. It will be understood that with this construction, an excess current in the armature circuit in one direction will cause the core or armature 9 to move endwise, in one direction, and an excess armature current in the opposite direction will cause the core to move oppositely. Opposite the ends of the core 9 are arranged switch arms 12 and 13, so that when the core is moved in one direction it will move the switch arm 12, and when the core is moved in the opposite direction it will move the switch arm 13. The switch arm 12 normally rests against a contact 14, the arm and contact constituting a switch *s*, which is normally held closed by a spring 15. The switch arm 13 is normally held against a stop 16, by the spring 15, and when the switch arm 13 is moved away from the stop it engages a contact 17. The arm 13 and contact 17 constitute a normally open switch *s'*.

The switch *s* normally connects a hand regulating arm or member 18 with the field wire 5 by conductors 19 and 20, the arrangement being such that when the regulating member is on the last contact 21 of the resistance, the latter will be entirely short-circuited, and as said member is moved to the left the amount of resistance short-circuited will be decreased until, when the member 18 rests on the contact 22, all of the field resistance will be included in circuit with the field windings. The switch arms 12 and 13 are shown connected together by a conductor 23, and the contact 17 of the switch *s'* is connected by a conductor 24 to the field wire 5, at the right of the resistance. With this arrangement, when the switch *s'* is closed, the field resistance 5ª is short-circuited through conductor 19, switch *s*, conductor 23, switch *s'*, and conductor 24.

In operation, assuming the line switch to be closed and the regulating member 18 to be resting upon the contact 21 of the resistance, the resistance will be entirely cut out, the circuit flowing through the shunt around the resistance formed by conductor 19, switch *s*, conductor 20 and member 18. Thus, the motor will operate at normal speed with full field strength. If, now, the member 18 is moved from the contact 21 to its position shown in the drawing, on contact 25, that part of the resistance between contacts 25 and 21 will be included in the field circuit, and this will cause the field to be weakened and the armature current will increase correspondingly. The increase in the armature current will cause the coil 8 to move the polarized core 9 against the switch arm 13 and the switch $s'$ will be closed, thus momentarily short-circuiting the entire field resistance, causing the field to strengthen and the armature current to fall. Because of the decrease in the armature current the polarized core 9 is drawn back by the coil 10 and the switch $s'$ is allowed to open, which again results in the introduction of the resistance included between contacts 21 and 25. The closure and opening of the switch $s'$ will be continued rapidly, alternately including and excluding the field resistance while the motor armature is increasing its speed to that pre-determined by the position of the regulating member 18. Any further movement of the regulating arm 18 to increase the resistance in the field circuit will be followed by vibration of the switch $s'$ while the motor is adjusting itself to its higher pre-determined speed. On the other hand, if the member 18 is moved in a direction to cut resistance out of the field circuit, for the purpose of slowing down the motor, the switch $s$ will be vibrated until the motor comes to its lower pre-set speed, when the vibration will stop. Thus, if the member 18 is on the contact 22, wherein all the field resistance is in circuit, and said member is then moved to contact 25, or the contact 21, cutting out a part or all of the resistance, the field of the motor will be suddenly strengthened and the armature, owing to its inertia, and while slowing down, will generate a current in the circuit 6 in the reverse direction, which will cause the polarized core 9 to strike against the switch arm 12 and open the switch $s$, thus interrupting the circuit through the member 18 and momentarily including the entire field resistance in the field circuit. This will be immediately followed by a drop in the armature current and the closure of the switch $s$, which will include the member 18 and cut out resistance, again weakening the field, with the result that the armature will again send a current in the reverse direction through the coil 8, and the core 9 will again open the switch $s$. This vibration will be continued until the armature reaches a speed in accordance with the field strength determined by the position of the member 18.

What I claim is:

1. The combination with an electric motor having a shunt field winding, of a resistance in the field circuit, a member for regulating the amount of resistance in said circuit, a normally closed relay switch for including said member in said circuit, a normally open relay switch for shunting said resistance, a polarized armature adapted to actuate either of said switches, and means for actuating said polarized armature comprising a coil included in the armature circuit of the motor.

2. The combination with an electric motor having a shunt field winding, of a resistance in the field circuit, a member for regulating the amount of resistance in said circuit, a normally closed relay switch for including said member in said circuit, a normally open relay switch for shunting said resistance, a polarized armature arranged between the movable members of said switches and adapted to actuate each member separately, and means for actuating the polarized armature comprising a coil included in the armature circuit.

In testimony whereof I have affixed my signature.

GEORGE H. WHITTINGHAM.